(12) United States Patent
Maller

(10) Patent No.: US 7,490,131 B2
(45) Date of Patent: Feb. 10, 2009

(54) EMAIL FILTERING METHODS AND SYSTEMS

(75) Inventor: Steven T. Maller, Burlingame, CA (US)

(73) Assignee: Microsoft Corporation, Renton, WA (US)

( * ) Notice: Subject to any disclaimer, the term of this patent is extended or adjusted under 35 U.S.C. 154(b) by 7 days.

(21) Appl. No.: 11/426,379

(22) Filed: Jun. 26, 2006

(65) Prior Publication Data
US 2007/0061404 A1 Mar. 15, 2007

Related U.S. Application Data

(63) Continuation of application No. 09/497,992, filed on Feb. 4, 2000, now Pat. No. 7,072,942.

(51) Int. Cl.
*G06F 15/16* (2006.01)
*G06F 15/173* (2006.01)
(52) U.S. Cl. .................... 709/206; 709/207; 709/228; 709/240
(58) Field of Classification Search .............. 709/206, 709/207, 240, 228
See application file for complete search history.

(56) References Cited

U.S. PATENT DOCUMENTS

| | | | | |
|---|---|---|---|---|
| 5,619,648 | A * | 4/1997 | Canale et al. | 709/206 |
| 5,999,932 | A * | 12/1999 | Paul | 707/10 |
| 6,105,131 | A * | 8/2000 | Carroll | 713/155 |
| 6,199,103 | B1 * | 3/2001 | Sakaguchi et al. | 709/206 |
| 6,453,327 | B1 * | 9/2002 | Nielsen | 715/205 |
| 6,546,390 | B1 * | 4/2003 | Pollack et al. | 707/7 |
| 6,546,416 | B1 * | 4/2003 | Kirsch | 709/206 |
| 6,654,787 | B1 * | 11/2003 | Aronson et al. | 709/206 |
| 6,788,769 | B1 * | 9/2004 | Waites | 379/93.24 |
| 6,868,436 | B1 * | 3/2005 | Fleming, III | 709/206 |

* cited by examiner

*Primary Examiner*—William C Vaughn, Jr.
*Assistant Examiner*—Kristie D Shingles

(57) ABSTRACT

Various embodiments of the invention address two critical problems that current email service providers face. First, there is the problem of maintaining high levels of customer service when email server systems are inundated with spam. Second, there is the problem of reducing the system-wide impact that spam has on the email delivery system. Current embodiments are directed to determining whether an email message is an unwanted bulk email message without necessarily considering the message that is conveyed by any portion of the email message. Through analyses of patterns of delivery of these email messages, profiles are built that allow an email server to ascertain whether there is a likelihood that any one particular email message constitutes an unwanted email message. If an email message is determined to likely constitute an unwanted email message, then memory-saving measures are implemented. In preferred embodiments, one copy of the email message is saved at a central, shared location that can be accessed by each of the intended recipients. This avoids having to replicate the email message across the system for each of the recipients.

19 Claims, 8 Drawing Sheets

EMAIL FILTERING METHODS AND SYSTEMS

RELATED APPLICATION

This application is a continuation of and claims priority to U.S. patent application Ser. No. 09/497,992, the disclosure of which is incorporated by reference herein.

TECHNICAL FIELD

This invention relates to email filtering methods and systems.

BACKGROUND OF THE INVENTION

Email systems facilitate the exchange of electronic mail over a network, such as a LAN (local area network), WAN (wide area network), or public network (e.g., Internet). Most people are familiar with traditional computer email systems, which are constructed on a client-server model. The email system involves a server-based mail program residing on the server computer to manage the exchange of email messages over one or more networks and a client-based mail program residing on the client to implement a mailbox that receives and holds the email messages for a user The client-based mail program also implements a graphical user interface that enables the user to open and read mail, or to create new mail messages.

Other email systems have evolved that are more focused on the server side of the equation than on the client side. In these types of systems, email servers provide the bulk of the functionality that a client sees when the client enters the email environment. One such system is shown generally at 20 in FIG. 1 and includes an email server system 22 having a processor 24 that is configured to receive email messages from a sender and distribute copies of the email messages to one or more recipients. A recipient storage location 26 is provided and includes a plurality of storage locations that are dedicated to individual recipients, with three exemplary dedicated storage locations being shown at 28, 30 and 32. The email messages that are received by the server system are copied directly into the dedicated storage locations (sometimes referred to as "inboxes") for each recipient. If one message is received with nine specified recipients, then nine copies of the message are made and placed into nine separate dedicated recipient storage locations.

In systems such as these, many of the functions that are traditionally implemented by a client machine are implemented by the server system 22. For example, email messages, records, passwords, user preferences, address lists, and the like are all saved on the server side in storage locations that are dedicated for each recipient. Recipients or clients must then typically log in with the server and run a browser program that lets them work within the email system to read their messages. Logging in with the server is typically accomplished over a computer network such as the Internet, and through the use of a suitable web browser. The email environment is generated by the server through the use of HTML or web pages that present the recipient or client with a screen that looks like an email box. All email messages are delivered using the web page format. Microsoft's Hotmail service is an exemplary system.

Email is a tremendously fast and efficient way to send electronic messages. One of the problems that plagues the efficient use of email is the growing presence of unwanted and unsolicited emails. These emails are typically referred to as "spam." Spam can include unsolicited commercial emails (UCE) or non-commercial emails. Spam is a menace that clogs email systems, slows down performance, and severely impacts the manner in which email services are provided by an email server to its clients.

From an operational standpoint, UCE or spam can consume vast amounts of disk space and can monopolize many other machine resources. For example, in the FIG. 1 example, when an email message is received by server system 22, a copy for each intended recipient is made and placed into the dedicated storage location for each recipient. In the illustrated example, processor 24 receives a spam message and makes a copy of the spam message for each of the intended recipients, i.e. recipients 28, 30 and 32. If a large number of recipients are specified by the sender, then a large amount of server memory can be consumed by replicating the message and placing it in each dedicated storage location for each specified recipient. The typical message has the following fields that are shown in the figure: "TO", "FROM", "CC", "BC", and "SUBJECT".

From a customer service standpoint, system administrators are often at a loss to combat the delivery of spam to their individual clients. This can and often does result in large numbers of complaints and bounced email messages. Additionally, customers often do not wish to even receive certain types of morally or otherwise offensive emails. Yet, because the spammers (those who promulgate spam) predominate, innocent clients continue to be bombarded with unwanted email messages. From a legal standpoint, valuable time and resources are wasted in pursuing spammers because of the various havoc they wreak on network systems. Needless to say, spam continues to plague those who are in the business of providing email services to clients.

Accordingly, this invention arose out of concerns associated with providing improved systems and methods for reducing the impact that UCE and spam has on email recipients.

SUMMARY OF THE INVENTION

Various embodiments of the invention address two critical problems that current email service providers face. First, there is the problem of maintaining high levels of customer service when email server systems are inundated with spam. Second, there is the problem of reducing the system-wide impact that spam has on the email delivery system. Current embodiments are directed to determining whether an email message is an unwanted bulk email message without necessarily considering the message that is conveyed by any portion of the email message. Through analyses of patterns of delivery of these email messages, profiles are built that allow an email server to ascertain whether there is a likelihood that any one particular email message constitutes an unwanted email message. If an email message is determined to likely constitute an unwanted email message, then memory-saving measures are implemented. In preferred embodiments, one copy of the email message is saved at a central, shared location that can be accessed by each of the intended recipients. This avoids having to replicate the email message across the system for each of the recipients.

DETAILED DESCRIPTION

Overview

Figure 1:
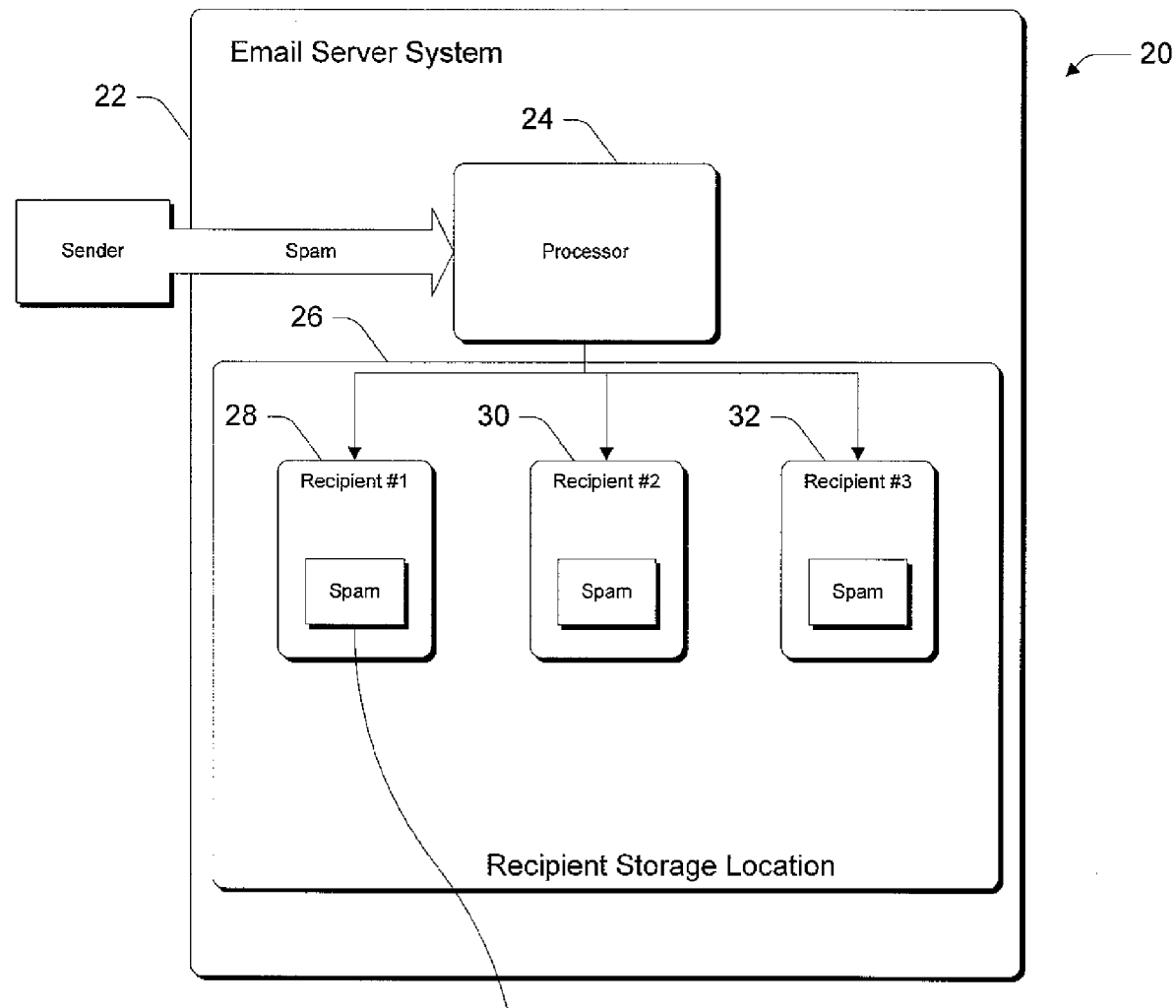
FIG. 1 is a high level diagram of a prior art email server system.

Unwanted email messages can come in many different packages such as unsolicited commercial email (UCE) messages that seek to have recipients invest or spend money, or email messages that are not necessarily commercial in nature, but nonetheless are undesirable because of their message content, e.g. obscene or morally inflammatory email messages. Various embodiments of the invention recognize that unwanted emails messages often typically have delivery patterns that distinguish them from other wanted emails. The delivery patterns are often independent of the messages conveyed by any of the content of the email messages, e.g. independent of the content of the sender's address field, the subject field, and the message field. That is, determining that an email message is unwanted does not necessarily depend on reading an email message and interpreting its content. For example, some of the patterns that unwanted email messages exhibit are that they typically specify a large number of recipient addresses, and a determinable percentage of the specified recipient addresses may be invalid. Another pattern concerns the size of the email message. That is, many unwanted email messages are larger than a determinable size. Over time, profiles are built based upon the these and other delivery patterns. These profiles are then used by the server to assess an incoming email message and determine whether it is likely to constitute an unwanted email message. Without reading the content of an email message it is difficult to ascertain with complete certainty whether it is in fact unwanted. Yet, the profiles that are built can assign a degree of likelihood that any given email message does or does not constitute an unwanted email message.

If an email message likely constitutes an unwanted email message, then one or more preventative measures can be taken to minimize the impact that the email message has on its intended recipients and on the server system. For example, the server might redirect an incoming email message if it has determined that the email message is likely to be unwanted. Such redirection might involve, for instance, placing the email message in a specially-defined "folder" or storage location, which has been created to receive such messages. As another example useful in various server-side embodiments, if a server determines that an incoming email message likely constitutes an unwanted email message, the server makes a single copy of it and places it in a shared storage location. This shared location is represented to the user as a special folder or storage location similar to an inbox. Individual recipients are notified and can read the email message at the shared location. Thus, the server avoids having to make and store numerous copies of the email message. If a recipient so desires, they can request a copy of the email message at which time the server places a copy of it in a dedicated recipient storage location for them.

Embodiments of the invention also provide a robust collection of heuristics that go far beyond simply screening an email message based upon a sender's address. The heuristics can consider parameters that are independent of the message conveyed by any content portion of an email message, and/or parameters that are dependent upon the message thus conveyed. Flexibility is provided by enabling the parameters to be adjusted to accommodate different patterns. For example, one set of heuristics might be used during prime computing time, while another set is used during slower computing times.

Further, solutions are provided that enable the server and its clients to work in concert to uniquely tailor the server's screening to fit the individual needs of the clients. The concept of a desirability index establishes values that are assigned to various degrees of desirability that an email message can have. Various parameters having parameter values are associated with each index value. A user can adjust either the parameter values or the index values to establish a degree of desirability. Email messages are then evaluated against the defined index value.

Figure 2:
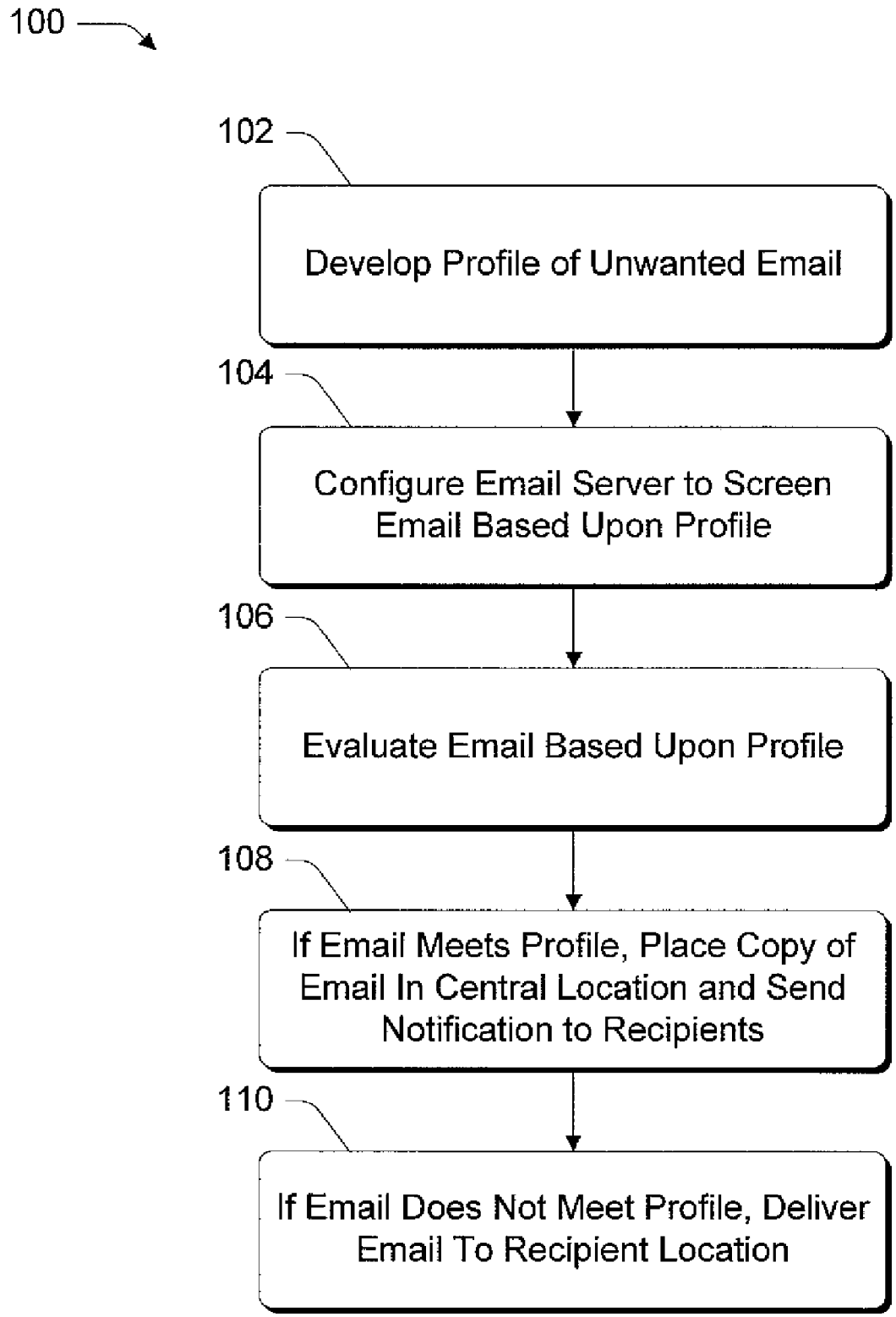
FIG. 2 is a flow diagram that describes a process in accordance with one embodiment of the invention.

FIG. 2 shows a flow diagram at 100 that describes processing in accordance with embodiments of the invention. The processing that is described preferably takes place on the server side and is executed by the server system. The server can be a dedicated server that is specifically programmed to screen email messages. A profile of unwanted email is first developed at step 102. The profile preferably takes into account information that is not dependent upon the message conveyed by any of the content of an email message. The server is configured at step 104 to screen email messages based upon the profile. The server evaluates each of the email messages that it receives at step 106. If an email message meets the profile, then the server places a copy of the email message in a central location at step 108 and sends a notification to each of the recipients that an email message has been received. In preferred embodiments, only one copy is saved by the server, although other copies can be made if a recipient has specifically requested to receive email messages from a particular sender. The one copy is placed in a location that can be shared by each of the intended recipients for reading the message. If an email message does not meet the profile, then the server delivers the email message to a recipient storage location at step 110. In this way, email messages that have a high likelihood of constituting unwanted email or spam are not replicated across the server's storage system. Rather, storage is conserved by saving only one copy of the email message.

Computer System

Figure 3:
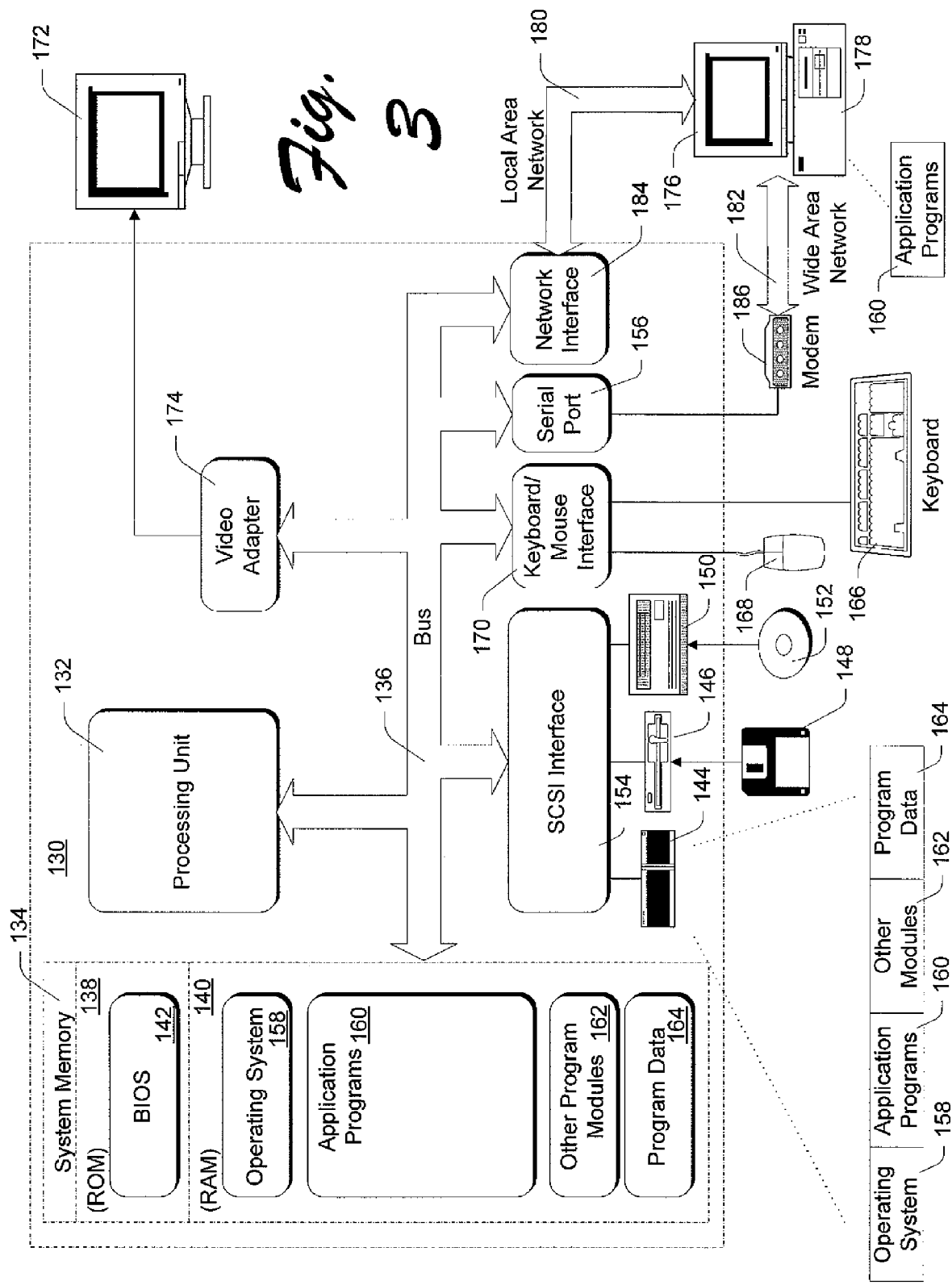
FIG. 3 is a diagram of a computer system that can be used to implement various embodiments of the invention.

Preliminarily, FIG. 3 shows a general example of a desktop computer 130 that can be used in accordance with the invention. Computer 130 can be used to implement server or client machines.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Email Server System Architecture

Figure 4:
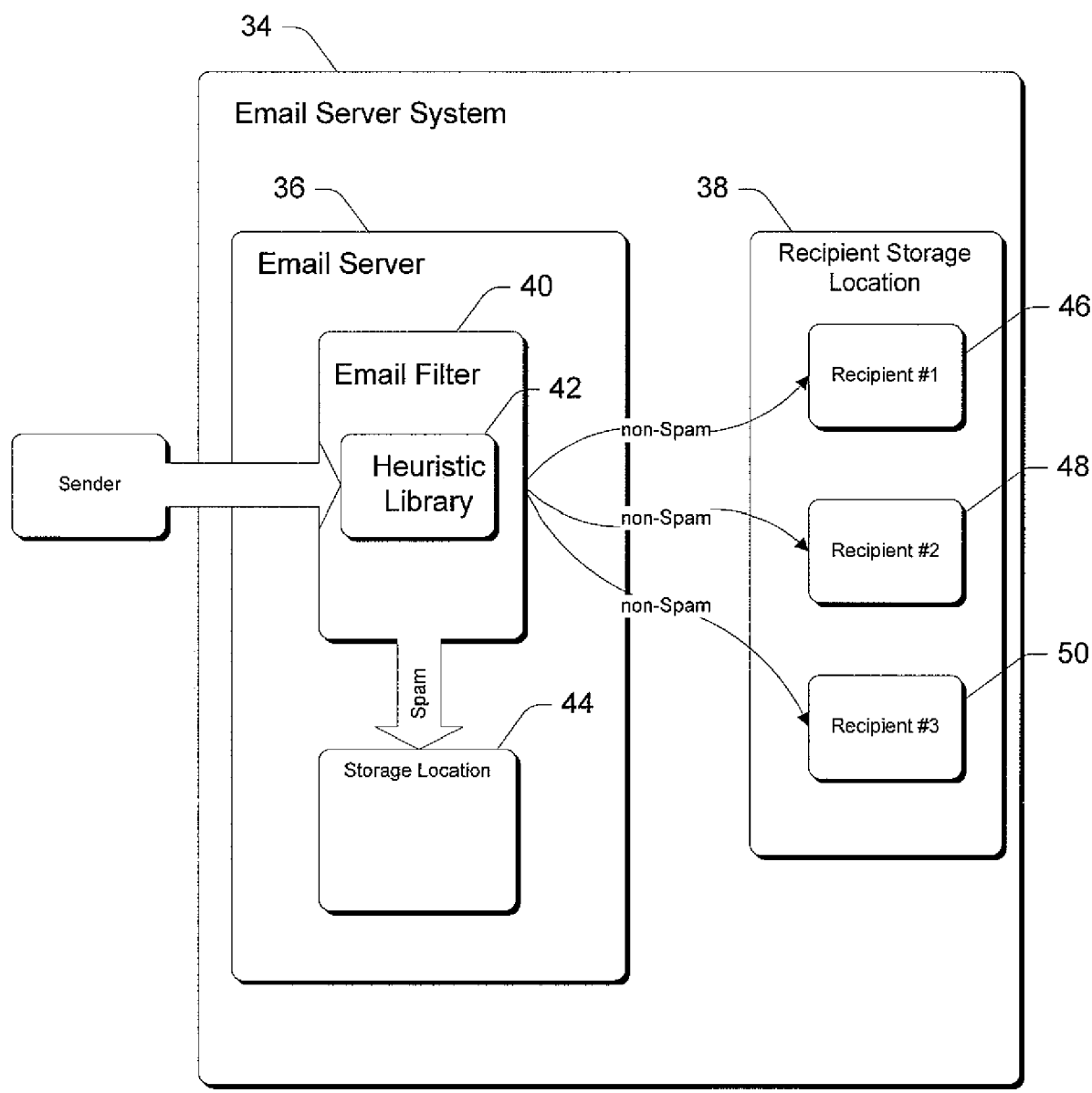
FIG. 4 is a high level diagram of an email server system in accordance with one embodiment of the invention.

FIG. 4 shows an exemplary email server system 34 in accordance with one embodiment of the invention. System 34 includes one or more email servers 36 and a recipient storage location 38. Server 36 includes an email filter or filter processor 40 having a heuristic library 42 and a storage location 44 that is managed by email server 36. Although email server system 34 is shown as an integral unit, it is to be understood that the various constituent parts thereof can be separately implemented and associated with one another. Recipient storage location 38 includes a plurality of dedicated storage locations for each of the users or recipients, with exemplary locations being shown at 46, 48 and 50. Bulk email messages are received at the email server location and are typically addressed to a plurality of recipients. Server 36 filters various email messages by applying one or more heuristics that are defined in heuristic library 42 to an incoming email message. The heuristics enable the filter to determine whether an email message likely constitutes an unwanted email message. One of the goals of some embodiments of the present invention is to ascertain whether an email message is unwanted without having to consider the message that is conveyed by the text of the email message. Accordingly, some of the heuristics are directed to looking at aspects of an email message that are not necessarily related to the content of the message itself. Thus, some heuristics consider the number of recipients to which a particular email message is addressed and the overall size of the email message. If the email message likely constitutes an unwanted email message, it is redirected to a first location such as storage location 44, rather than being placed in one or more of the dedicated storage locations 46, 48 and 50 for the addressed recipients. This constitutes but one way of ensuring that the server does not make as many copies of the email message as there are specified recipient addresses. Email messages that are found not likely to constitute unwanted email messages are delivered to the individual respective dedicated storage locations 46, 48 and 50 and can be provided to the recipients in due course.

In a preferred embodiment, only a single copy of the email message is maintained at storage location 44. Other copies can be made if a particular recipient has requested to receive email messages from a particular sender, as will become apparent below. This avoids having to reproduce the email message for each and every addressed recipient and store the email messages at multiple locations throughout the server system. Since many unwanted email messages are bulk in nature (i.e. addressed to many intended recipients) storage location 44 can also be considered as a bulk email folder into which bulk email messages can be first placed.

Figure 5:
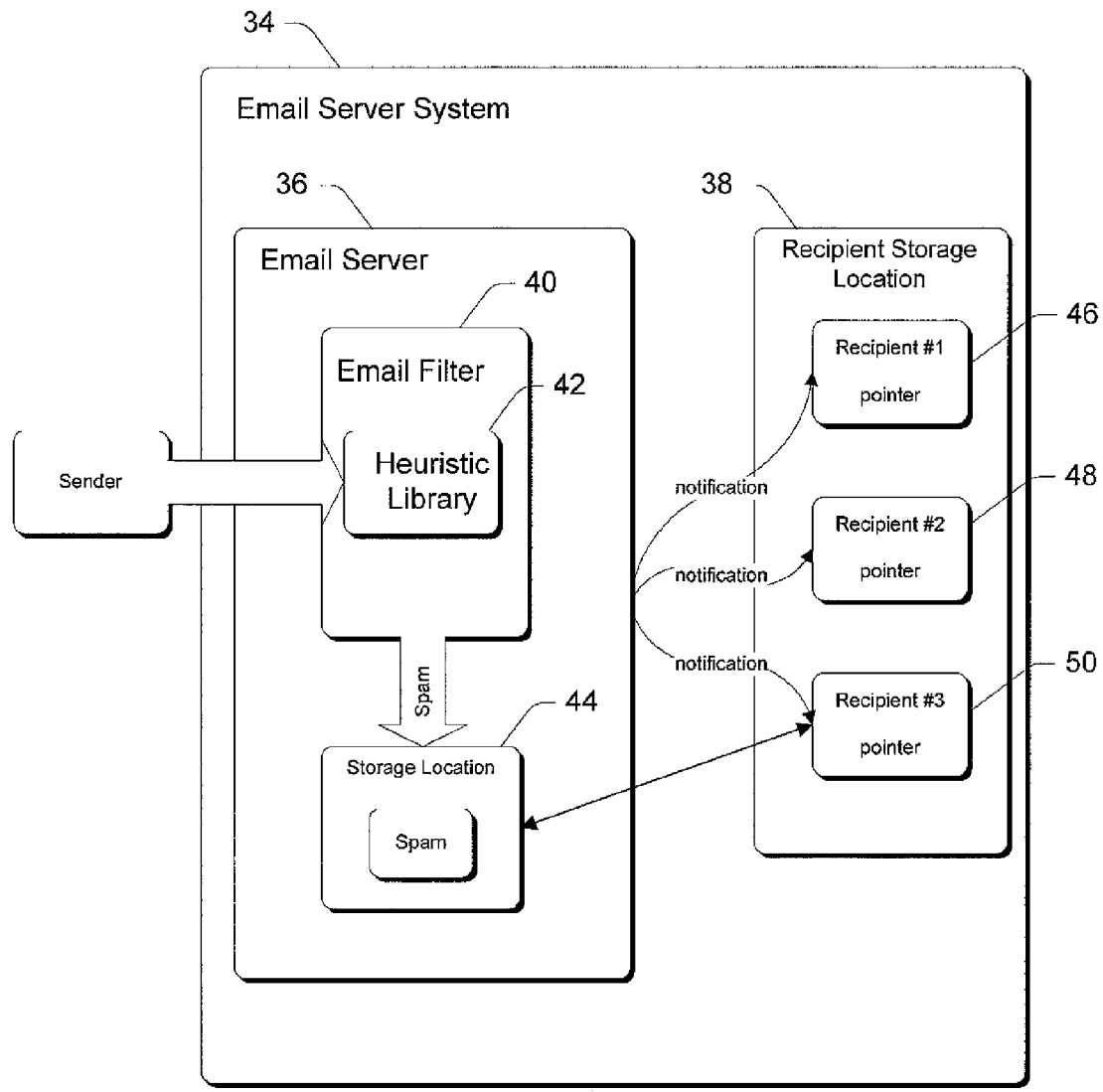
FIG. 5 is a diagram of the FIG. 4 email server system.

FIG. 5 shows the FIG. 4 system after an email message has been received and determined to constitute an unwanted bulk email message or spam. The spam message is stored at storage location 44. Server 36 then notifies each of the intended recipients or specified addressees that an email has been received for them. One way of sending notification to the recipients is to place a pointer at a second location that is dedicated to each recipient, e.g. an email folder of each recipient. Then, when the recipient logs in to check their email, the pointer will allow them to access and read the stored email message if they so desire. This is preferably done without making any copies of the email message, other than the one that is stored at storage location 44. The recipient is also free to request that the server make a copy of the email message and store the email message in a dedicated recipient-specific storage location. In the illustrated example, the third recipient has requested a copy of the spam message which is now stored in their own dedicated storage location. In this example, storage location 44 is shared among the intended recipients. However, the fact that it is shared is virtually transparent to the recipients. By using the pointer that is placed at the second location, each recipient can open the corresponding email message (in which case they can view the shared copy), delete the email message (in which case the pointer is deleted), or move the email message (in which case an actual copy of the email message is itself generated and stored in a location designated by the recipient).

Figure 6:
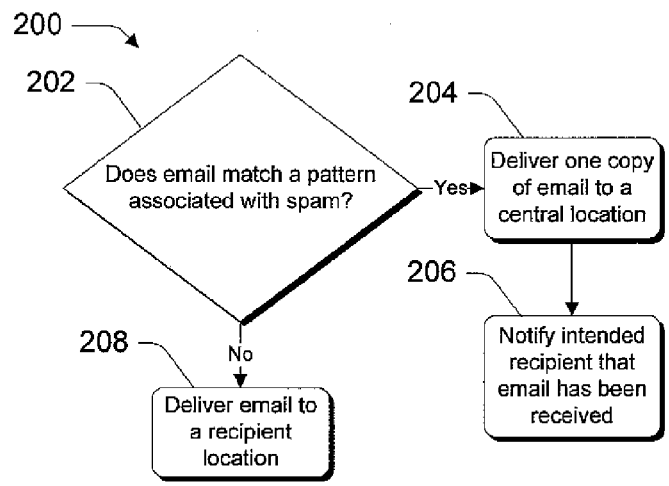
FIG. 6 is a flow diagram that describes processing in accordance with one embodiment of the invention.

FIG. 6 shows a decision diagram generally at 200 that describes decision-making that can take place in accordance with an embodiment of the invention. Step 202 determines whether an email message matches a pattern that is associated with spam or unwanted email messages. One way of defining patterns is through the use of heuristics that are discussed below in more detail. If the email message likely constitutes an unwanted email message, then step 204 delivers one copy of the email message to a central location such as location 44. Preferably, the central location is one that can be shared by the intended recipients to read the email thereby eliminating the need to reproduce the email system wide for all of the intended recipients. Step 206 notifies the intended recipients that an email message has been received. The recipients are then free to access the email message at the shared location and request that they receive their own copy of the email message. If step 202 determines that an email message is not likely to be unwanted, then step 208 delivers the email message to a recipient location, such as locations 46, 48 and 50 in FIG. 5.

Heuristics

One of the advantages of the present invention is the robust collection of heuristics that can be used by email server 36 to screen for unwanted email. Preferably, the heuristics are built upon the principle that unwanted email or spam typically exhibits a pattern when it is delivered. Many times this pattern is independent of the message that is conveyed by any of the content of a particular message. For example, one need not necessarily read the content of an unsolicited email describing adult web sites if it can be ascertained from other aspects of the message that it is likely to constitute unwanted email. For example, unwanted email is typically addressed to a large number of specified recipient addresses. These addresses may not appear in the "To:" field, but rather will appear in the "BC" (blind copy) field, as in FIG. 1. Many times, a number of these addresses will be invalid as a result of being computer generated to cover a large number of address permutations. Additionally, some unwanted email messages might be very large in size. By recognizing these aspects of an email message, heuristics are designed that consider factors unrelated to a message's content. Content-based filtering can, however, still be used in connection with one or more of the embodiments of the invention. Hence, determinations concerning whether an email message is likely or not to constitute spam can be made, in some embodiments, without accessing any content of the sender's address field, the subject field, or the message field.

As a simple example only, nine heuristics are set forth in Table 1 below. These heuristics are not intended to limit the invention in any way. Rather, they are only given to illustrate certain approaches that can be taken.

TABLE 1

| Heuristic | Heuristic Description |
|---|---|
| 1 | Is the email message addressed to more than <insert number> recipients? |
| 2 | Is the email message addressed to more than <insert number> percent of invalid addresses? |
| 3 | Is the email message larger than <insert number> bytes? |
| 4 | Is the email message indirectly addressed to more than <insert number> recipients? |
| 5 | Is the email message delivered after 11:30 P.M local time? |
| 6 | Heuristic 5 and any of Heuristics 1, 2, 3, or 4. |
| 7 | Heuristics 1 and 2. |
| 8 | Heuristics 1 or 2. |
| 9 | Heuristics 1 and 3. |

Heuristic 1 determines whether a particular email message is addressed to a definable number of recipients. This recognizes a pattern that certain email messages that are unwanted are often addressed to a large number of recipients. The heuristic includes a parameter that is indicated by the "<insert number>" field. This permits the heuristic to be adjusted to accommodate different delivery patterns. Heuristic 2 determines whether a certain percentage of the specified addresses are invalid. This recognizes a pattern that often times an unwanted email message will be addressed to a large number of invalid accounts. The heuristic also includes a parameter that is indicated by the "<insert number>" field that permits the heuristic to be adjusted. Heuristic 3 determines whether an email message is larger than a definable size and includes a parameter that is indicated by the "<insert number>" field. This permits the heuristic to be adjusted to accommodate different delivery patterns. This heuristic recognizes a pattern that certain unwanted emails may have size characteristics that are distinguishable over ordinary email messages. Heuristic 4 determines whether an email message is indirectly addressed to a certain number of recipients and includes a parameter that is indicated by the "<insert number>" field. This permits the heuristic to be adjusted to accommodate different delivery patterns. This heuristic recognizes a pattern that unwanted email messages may have a large number of recipients "blind copied". An email message can be considered as indirectly addressed to a recipient if the recipient's address is not specified in the "TO" field, i.e. it appears either in the "CC" or "BC" fields. Heuristic 5 recognizes a pattern that certain unwanted emails might typically be delivered after certain times in the evening. The remaining heuristics constitute combinations of the heuristics mentioned above.

The heuristics constitute but one way of defining different profiles that can be used to assess whether a particular email message is likely to be unwanted. By virtue of the fact that different combinations of heuristics can be used, and certain parameters values within certain heuristics can be varied, a robust set of flexible, adaptable profiles can be built and maintained. In addition, the profiles can be quickly adapted, system-wide, to address subtle changes in the delivery patterns of the spam.

Desirability Index

Figure 7:
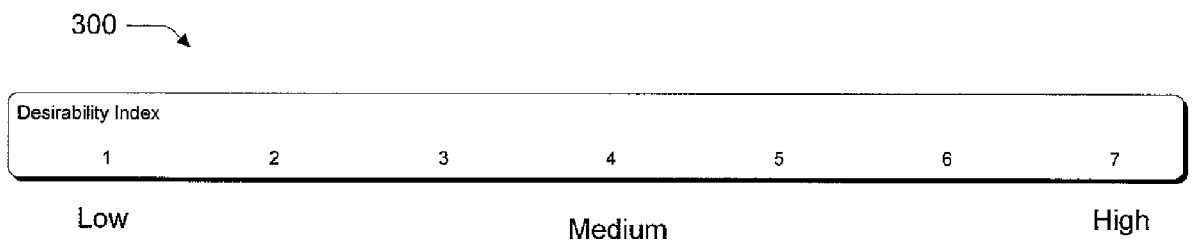
FIG. 7 is a diagram of a desirability index in accordance with one embodiment of the invention.

In one embodiment, the concept of a desirability index is used to assess email messages. FIG. 7 shows one such exemplary index at 300. The idea behind the desirability index is that index values, here 1-7, are assigned to various degrees of desirability that an email message can have. The degrees of desirability range from a low desirability value of 1 to a high desirability value of 7. The index values are associated with a plurality of parameters having parameter values. For exemplary purposes only, Table 2 sets forth the index values that are cross-referenced against some example parameters.

TABLE 2

| Index Values | Number of specified recipient addresses | Percentage of invalid specified recipient addresses | Larger than X bytes | Delivery time |
|---|---|---|---|---|
| 1 | >1000 | >20% | >X | Between 11:30 P.M and 3:30 A.M. |
| 2 | 0 < y <= 200 | >10% | >X | Between 10:00 P.M. and 12:00 P.M. |
| 3 | 0 < y <= 150 | 5-15% | >X | Daytime |
| 4 | 0 < y <= 100 | 5-10% | <X | Daytime |
| 5 | <=30 | 0-10% | <X | Daytime |
| 6 | <=20 | 0-5% | <X | Daytime |
| 7 | <=20 | 0-3% | <X | Daytime |

The parameters in this example include: the number of specified recipient addresses, the percentage of invalid specified recipient addresses, a size parameter, and a delivery time parameter. The parameters each have values that correspond to the various index values. Some of the parameters do not depend on any message conveyed by any content of an email message. The parameter values are preferably adjustable so that different patterns of delivery can be examined.

Figure 8:
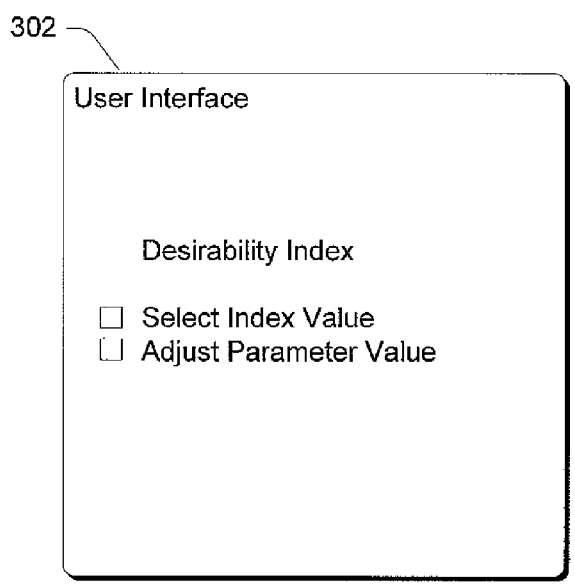
FIG. 8 is a diagram of a user interface in accordance with one embodiment of the invention.

FIG. 8 shows a user interface 302 that can be used in connection with desirability index 300. The user interface 302 is established so that a user, client, or recipient can adjust either or both of the individual parameter values or the index values. If the user adjusts a parameter value, then the index value associated with a certain degree of desirability is made either more or less restrictive. If the user adjusts the index value, then the user changes the degree of desirability. The email server then uses the selected index value to assess and evaluate incoming email messages for the user.

For example, when an email message is received at the server location, a score can be calculated based upon one or more of the parameters. Any number or combination of parameters can be used. In addition, parameters other than those specifically shown can be used. The score is then compared with an index value that is selected by a user or recipient. In this manner, the user-selected index value represents a threshold value. The index or threshold value defines a likelihood that a particular email message will constitute an unwanted email message. If an email message's score exceeds the threshold value (here, in the negative direction), then the email message likely constitutes one that a user or recipient does not want. If this is the case, the server can then place a copy of the email message at storage location 44 (FIG. 5) and send notifications to the intended recipients.

Address Screening of Bulk Mail

Some bulk email messages, by their very nature, are desirable to some users. By simply screening the bulk email messages as described above, it is possible that some users might not see the bulk email messages. This is especially so if the email messages at the single, shared location are only maintained for a short determinable period of time. To address this situation, embodiments of the invention provide additional address screening for bulk email messages. Address screening permits a user or recipient to receive specified bulk email messages without having to read the email messages from the single, shared location. The user or recipient can specify a list of approved senders. This provides an advantageous way for a user to receive bulk email messages that they do not want to be filtered. For example, Microsoft may send bulk email messages that describe various software upgrades to its users. A user who wishes to receive these bulk email messages can simply add "microsoft.com" as a domain name from which email messages will always be accepted. In addition, address screening also permits users to screen bulk email messages based upon whether they are directly addressed in the email message, i.e. their address appears in the "TO" field and not in the "CC" or "BC" fields. This permits a user to screen potential bulk email messages by looking for email messages in which they are blind copied. Combining these two address screening techniques sets up a powerful screening mechanism that allows only those bulk email messages that meet the specified criteria to be placed into a user-dedicated storage location. It should be apparent that as to other users who have not specifically placed a sender in their list of approved senders, the email message will be placed in the single, shared location and subsequent notifications will be sent out.

Figure 9:
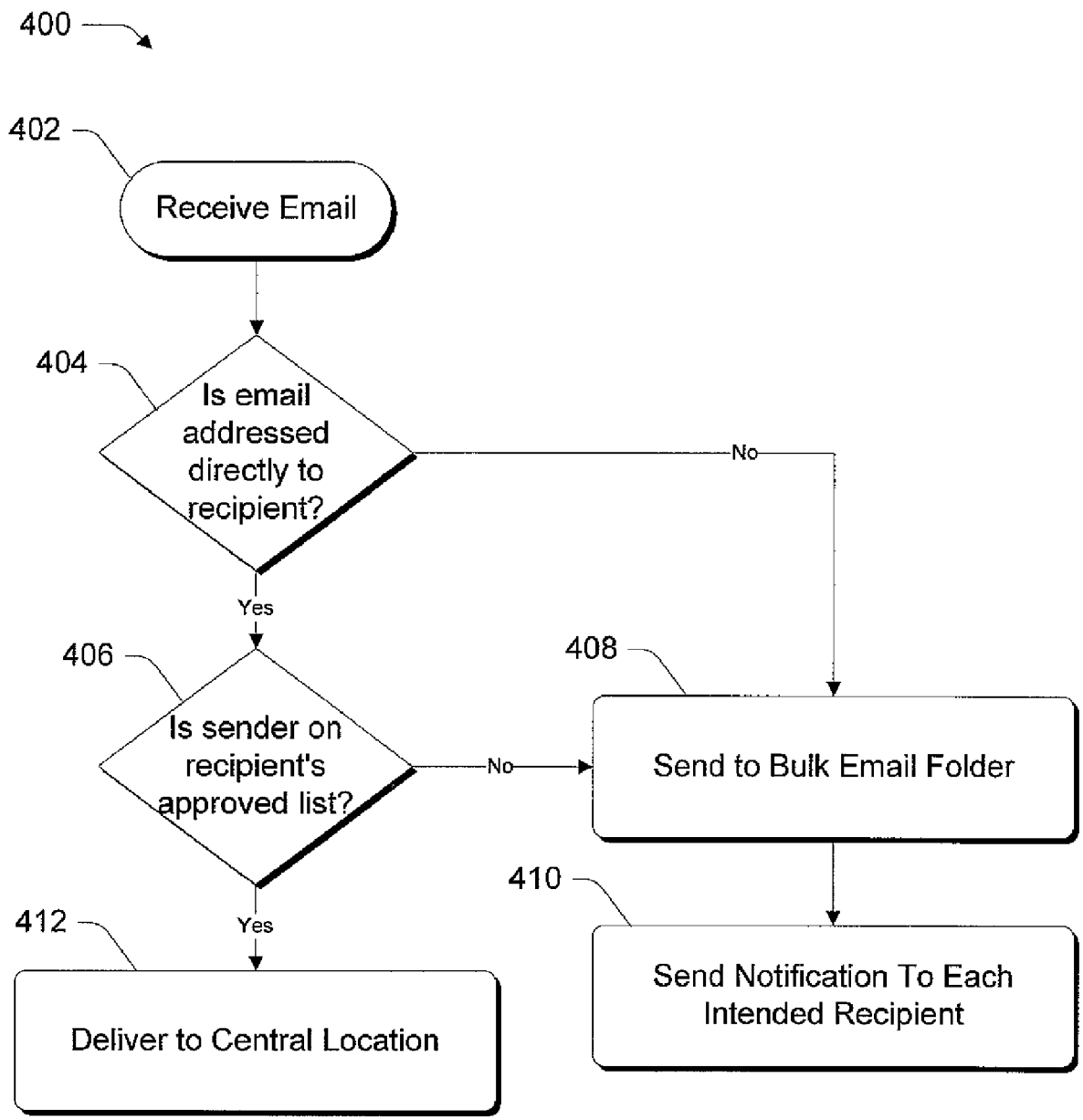
FIG. 9 is a flow diagram that describes processing in accordance with one embodiment of the invention.

FIG. 9 shows a flow diagram at 400 that describes processing in accordance with one address screening embodiment. The server receives an email message at step 402 and determines it to be a bulk email message. Exemplary ways of determining whether an email message is a bulk message are described above and include determining the number of users or recipients to which the email message is addressed. The server then determines whether the bulk email message is addressed directly to a recipient at step 404. If a recipient's address appears in the "CC" or the "BC" field, it is not directly addressed to a recipient and is sent to the bulk email folder at step 408 and notifications are sent at step 410. If the email message is directly addressed to a recipient, step 406 determines whether the sender is on the recipient's list of approved senders. If the sender is not on the approved list, then the email message is sent to the bulk email folder at step 408 and notifications are sent at step 410. If the sender is on the recipient's list of approved senders, then the email message is delivered or placed in a dedicated recipient location at step 412, such as the user storage locations mentioned above.

Content Screening

Other embodiments of the invention recognize the fact that bulk email messages or spam often contains text that is identical or very similar to other bulk email messages or spam. This is the case, for example, when the same email messages are sent at different times, or the same or similar email messages are sitting in a queue awaiting delivery. For example, spammers may target some recipients on one day, and then target other recipients on another day with the same email message. If, for some reason, the spam escapes filtering when it is first sent, then it may be possible to pick it up on the second day if it is similar in content. Thus, a profile can be developed of unwanted email messages based upon whether the email messages are similar in content with other email messages. Email messages can be similar in content if they are identical or if they contain a definable amount of textual similarities. The email server then looks for email messages that meet the established profile. If the profile is met, then processing can take place as described above.

Application of the profile can take place by conducting simple text searches of the email messages that are received to ascertain whether any of their text matches text of any other email messages such as those that have been found to be spam. Alternately, different text-matching algorithms can be employed such as fuzzy text-matching algorithms that impart a degree of intelligence to the email server.

Hotmail Architecture

Figure 10:
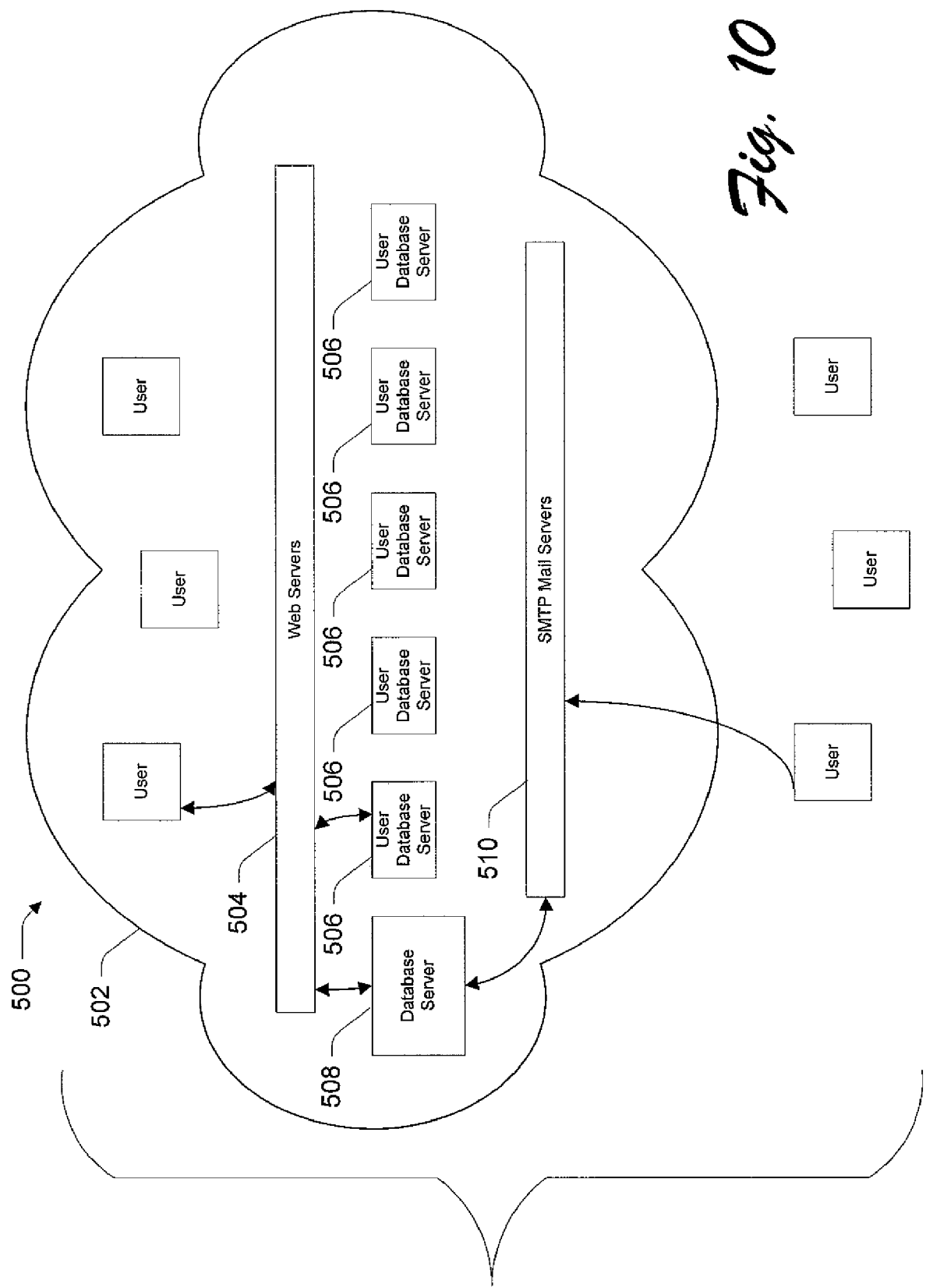
FIG. 10 is a diagram of an email delivery system in accordance with a preferred embodiment of the invention.

Preferred embodiments are implemented in conjunction with Microsoft's Hotmail service. FIG. 10 is a diagram that shows general architectural features of the Hotmail system generally at 500. A Hotmail "cloud" 502 encapsulates all of the Hotmail functionality so that everything a user or client sees on their screen is generated inside the Hotmail cloud. Hotmail cloud 502 includes an array of web servers 504. When a user logs in, they communicate with one of the servers of the array. The web servers are configured to serve web pages and do not contain any user data. The web servers can either pull HTML files off a storage disk or run a program to generate an appropriate HTML file. The file is then provided to a user browser executing on a user machine that requested the HTML file and is assembled by the browser at the user machine.

Hotmail cloud 502 includes one or more user database servers 506. All user or recipient data resides on the user database servers. This includes, for each account, all email messages, contact lists, personal preferences, passwords, and all other items typically associated with an email account. In practice, the user database servers are implemented by SUN Ultra Enterprise 4500-class servers. Each server stores from between 750,000 to 2,000,000 user accounts.

A database server 508 is provided and is an internal database server. Server 508 includes a list of all Hotmail users in memory, as well as the location of their user data on database servers 506. When a user contacts the Hotmail cloud 502, a web server of the web server array 504 contacts database server 508 to ascertain the location of the user's data on one of the user databases 506. The database server 508 returns the location to the web server which then can either assist a user in reading their email messages or assist a user in sending email messages.

When an email message is read by a user, the list of email messages are pulled by a web server of web server array 504. An appropriate web page is generated to appear as an email inbox. Links are embedded in the web page for the particular email messages. The web page is then sent to the user and assembled by the user's browser The links retrieve the particular email messages for a user.

When email is sent, a user clicks on an appropriate composition page which brings up a web page that looks like an email page. The user types a message and clicks send. The email message is packaged as an http web request that is received by a server of the server array 504. The web server then contacts database server 508 to ascertain the location of the intended recipient. If the recipient exists, then their location is returned to the web server which then deposits the email message in the appropriate account. This process is utilized for the users that are within the Hotmail cloud 502. That is, these users are subscribers to the Hotmail email service. Email messages can, however, be received into the Hotmail cloud from outside of the cloud, e.g. from the users that are depicted outside of the cloud in FIG. 10.

Hotmail cloud 502 also includes an array of SMTP mail servers 510 that perform essentially the same as server array 504. That is, when an email message is received from outside of the cloud, a server of array 510 contacts database server 508 to ascertain a recipient location among user databases 506, and then deposits the email message at one or more of the appropriate locations. The SMTP servers are completely open to the network through which the email messages come. The servers are unable to authenticate whether the sender of an email message is an actual sender or not. Additionally, the SMTP servers 510 are unable to authenticate the server that connects with it to deliver the email message. Because of this, spam can easily enter the Hotmail cloud 502.

When spam arrives, the server array (either of arrays 504 and 510) makes as many copies of the spam as there are valid recipients, and places each copy in a dedicated user storage location provided by user database 506. With millions of Hotmail users, it is easy to see how spam can be promulgated throughout the Hotmail system and consume valuable and expensive memory.

In preferred embodiments, server arrays 504 and 510 are configured to screen email message based upon a set of heuristics that determine whether an email message is likely to constitute an unwanted email message. Alternately, a dedicated server that is linked with each of these server arrays can perform the email screening functions. Exemplary heuristics are discussed above. If an email message is found to likely constitute an unwanted email message, a single copy is placed in a storage location that is not a dedicated user storage location. The server then notifies all of the valid specified recipients that an email message for them has been received. This can take place as discussed above.

CONCLUSION

Various embodiments of the invention address two critical problems that current email service providers face. First, there is the problem of maintaining high levels of customer service when email server systems are inundated with spam. Second, there is the problem of reducing the system-wide impact that spam has on the email delivery system. Current embodiments are directed to determining whether an email message is an unwanted bulk email message without necessarily considering the message that is conveyed by any portion of the email message. Through analyses of patterns of delivery of these email messages, profiles are built that allow an email server to ascertain whether there is a likelihood that any one particular email message constitutes an unwanted email message. If an email message is determined to likely constitute an unwanted email message, then memory-saving measures are implemented. In preferred embodiments, one copy of the email message is saved at a central, shared location that can be accessed by each of the intended recipients. This avoids having to replicate the email message across the system for each of the recipients.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented email filtering method comprising:
defining at least one heuristic that determines whether an incoming email message likely constitutes unsolicited email by considering an established delivery pattern that such unsolicited email typically exhibits when it is sent, wherein the at least one heuristic is independent of a message conveyed by any content of the email message, including content of the sender address field, subject field and message field, and wherein the pattern is associated with a percentage of specified recipient addresses of the email message that are invalid specified addresses;
applying the at least one heuristic to the email message; and
redirecting the email message if application of the at least one heuristic indicates that the email message likely constitutes unsolicited email, wherein redirecting comprises placing a copy of the email message at a location not dedicated to storage of just one user's email.

2. The computer-implemented email filtering method of claim 1, wherein the location comprises a location from which the copy can be accessed by more than one intended recipient of the email message.

3. The computer-implemented email filtering method of claim 1, wherein the at least one heuristic has at least one parameter that can be adjusted to vary the pattern that is considered.

4. The computer-implemented email filtering method of claim 1, wherein the pattern is associated with a number of specified recipient addresses of the email message.

5. The computer-implemented email filtering method of claim 1, wherein the pattern is associated with a size of the email message.

6. The computer-implemented email filtering method of claim 1, wherein the pattern is associated with a number of invalid specified recipient addresses of the email message.

7. The computer-implemented email filtering method of claim 1, wherein the location can be shared by a plurality of intended recipients for reading the email message, and wherein the method further comprises after the redirecting, notifying intended recipients of the email message that an email message intended for them has been redirected to the location.

8. One or more computer-readable storage media comprising computer-executable instructions that, when executed, perform acts comprising:
defining one or more heuristics to determine whether an email message likely constitutes unsolicited email by considering one or more established delivery patterns that such unsolicited email typically exhibits when it is sent, wherein at least one of the heuristics is independent of the message conveyed by any content of the email message, including content of the email message's sender address field, subject field and message field, and wherein at least one of the heuristics determines a percentage of specified recipient addresses of the email message that are invalid;
applying the one or more heuristics to the email message; and
redirecting the incoming email message if application of the one or more heuristics indicates that that the email message likely constitutes unsolicited email, wherein redirecting comprises placing a copy of the email message at a location not dedicated to storage of just one user's email.

9. The one or more computer-readable storage media of claim 8, wherein the copy can be accessed by more than one intended recipient of the email message.

10. The one or more computer-readable storage media of claim 8, wherein at least one of the heuristics has a parameter that can be adjusted to vary one of the one or more patterns considered.

11. The one or more computer-readable storage media of claim 8, wherein at least one of the one or more patterns is associated with a number of specified recipient addresses of the email message.

12. The one or more computer-readable storage media of claim 8, wherein at least one of the one or more patterns is associated with a size of the email message.

13. The one or more computer-readable storage media of claim 8, wherein at least one of the one or more patterns is associated with a number of invalid specified recipient addresses of the email message.

14. A computer-implemented method comprising:
receiving an email message at an email server that maintains inboxes for individual recipients;
calculating a score for the email message at the server based on one or more parameters having parameter values associated with the likelihood of whether an email message constitutes an unwanted email message;
comparing the score with a threshold value that defines a likelihood of whether an email message constitutes an unwanted email message, wherein the parameters and the threshold value are adjustable, wherein the score is based at least in part on one or both of:
a number of invalid specified recipients of the email message, or
a percentage of specified recipient addresses of the email message that are invalid;
responsive to the email message exceeding the threshold value, placing a copy of the email message at a first location other than an individual storage location dedicated to an individual intended recipient of the email message; and
sending a notification to intended recipients of the email message that a copy of an email message that was intended for them has been placed at the first location.

15. The computer-implemented method of claim 14, wherein the threshold value is determined independent of the message conveyed by any of the text that is contained in any part of the email message.

16. The computer-implemented method of claim 14, wherein the score is based at least in part on one or both of:
the email message size; or
a number of specified recipient addresses of the email message.

17. The computer-implemented method of claim 14, wherein the first location is a storage location managed by the email server.

18. The computer-implemented method of claim 14, further comprising responsive to a request from a recipient making a recipient copy of the email message and placing the recipient copy at a dedicated recipient storage location.

19. One or more computer-readable storage media having computer-readable instructions thereon which, when executed by a computer, implement the method of claim 14.

* * * * *

UNITED STATES PATENT AND TRADEMARK OFFICE
CERTIFICATE OF CORRECTION

| | |
|---|---|
| PATENT NO. | : 7,490,131 B2 |
| APPLICATION NO. | : 11/426379 |
| DATED | : February 10, 2009 |
| INVENTOR(S) | : Steven T. Maller |

It is certified that error appears in the above-identified patent and that said Letters Patent is hereby corrected as shown below:

In column 14, line 59, in Claim 18, delete "recipient" and insert -- recipient, --, therefor.

Signed and Sealed this
Third Day of May, 2011

David J. Kappos
*Director of the United States Patent and Trademark Office*